(12) United States Patent
Wodrich et al.

(10) Patent No.: US 11,333,739 B2
(45) Date of Patent: May 17, 2022

(54) VEHICULAR RADAR SYSTEM WITH AUTOMATIC SENSOR ALIGNMENT

(71) Applicant: Magna Electronics Inc., Auburn Hills, MI (US)

(72) Inventors: Helmut Arnold Hardow Wodrich, Clarkston, MI (US); Holger Hess, Aschaffenburg (DE); Sebastian Pliefke, Sailauf (DE); Walter Gordon Woodington, Lincoln, MA (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 267 days.

(21) Appl. No.: 16/801,605

(22) Filed: Feb. 26, 2020

(65) Prior Publication Data

US 2020/0271755 A1    Aug. 27, 2020

Related U.S. Application Data

(60) Provisional application No. 62/810,453, filed on Feb. 26, 2019.

(51) Int. Cl.
*G01S 7/40*    (2006.01)
*G01S 13/931*    (2020.01)

(52) U.S. Cl.
CPC .......... *G01S 7/4008* (2013.01); *G01S 7/4021* (2013.01); *G01S 13/931* (2013.01)

(58) Field of Classification Search
CPC .... G01S 13/325; G01S 13/867; G01S 13/878; G01S 13/931; G01S 2013/93271; G01S 2013/93272; G01S 2013/93274; G01S 7/4008; G01S 7/4021; G01S 7/4026
See application file for complete search history.

(56) References Cited

U.S. PATENT DOCUMENTS

| | | | |
|---|---|---|---|
| 5,949,331 A | 9/1999 | Schofield et al. |
| 6,587,186 B2 | 7/2003 | Bamji et al. |
| 6,674,895 B2 | 1/2004 | Rafii et al. |
| 6,690,268 B2 | 2/2004 | Schofield et al. |
| 6,693,517 B2 | 2/2004 | McCarthy et al. |
| 6,710,770 B2 | 3/2004 | Tomasi et al. |
| 6,906,793 B2 | 6/2005 | Bamji et al. |
| 6,919,549 B2 | 7/2005 | Bamji et al. |
| 7,157,685 B2 | 1/2007 | Bamji et al. |
| 7,176,438 B2 | 2/2007 | Bamji et al. |
| 7,212,663 B2 | 5/2007 | Tomasi |

(Continued)

*Primary Examiner* — Timothy X Pham
(74) *Attorney, Agent, or Firm* — Honigman LLP

(57) ABSTRACT

A method for calibrating a vehicular sensing system includes disposing the sensing system at a vehicle, with the sensing system including at least two radar sensors disposed at the vehicle so as to have respective fields of sensing exterior of the vehicle. At least one spherical radar reflector is disposed at a position exterior the vehicle where the fields of sensing of the at least two radar sensors overlap. A calibration mode of the sensing system is entered, and calibration radio waves are transmitted by at least one transmitter, and reflected calibration radio waves are received by receivers of the at least two radar sensors. The reflected calibration radio waves include the calibration radio waves reflected off the at least one spherical radar reflector. A controller calibrates the sensing system responsive to processing the received reflected calibration radio waves.

20 Claims, 2 Drawing Sheets

(56) References Cited

U.S. PATENT DOCUMENTS

| | | |
|---|---|---|
| 7,283,213 B2 | 10/2007 | O'Connor et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 8,013,780 B2 | 9/2011 | Lynam |
| 8,027,029 B2 | 9/2011 | Lu et al. |
| 8,698,894 B2 | 4/2014 | Briggance |
| 8,855,849 B1 | 10/2014 | Ferguson et al. |
| 9,036,026 B2 | 5/2015 | Dellantoni et al. |
| 9,146,898 B2 | 9/2015 | Ihlenburg et al. |
| 9,279,882 B2* | 3/2016 | Hukkeri .............. G01S 7/52004 |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 10,852,418 B2 | 12/2020 | Wodrich et al. |
| 2005/0267683 A1 | 12/2005 | Fujiwara et al. |
| 2008/0169963 A1 | 7/2008 | White et al. |
| 2010/0001897 A1 | 1/2010 | Lyman |
| 2010/0106356 A1* | 4/2010 | Trepagnier ............... G08G 1/16 701/25 |
| 2010/0245066 A1 | 9/2010 | Sarioglu et al. |
| 2012/0062743 A1 | 3/2012 | Lynam et al. |
| 2012/0218412 A1 | 8/2012 | Dellantoni et al. |
| 2013/0063257 A1 | 3/2013 | Schwindt et al. |
| 2013/0215271 A1 | 8/2013 | Lu |
| 2013/0222592 A1 | 8/2013 | Gieseke |
| 2013/0241766 A1 | 9/2013 | Kishigami et al. |
| 2014/0062762 A1 | 3/2014 | Kurono et al. |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0116573 A1 | 4/2016 | Appia et al. |
| 2016/0161602 A1* | 6/2016 | Prokhorov ............ G01S 7/4026 702/97 |
| 2016/0210853 A1 | 7/2016 | Koravadi |
| 2016/0291146 A1 | 10/2016 | Wang et al. |
| 2017/0129489 A1 | 5/2017 | Pawlicki et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0328997 A1 | 11/2017 | Silverstein et al. |
| 2017/0356994 A1 | 12/2017 | Wodrich et al. |
| 2018/0015875 A1 | 1/2018 | May et al. |
| 2018/0045812 A1 | 2/2018 | Hess |
| 2018/0065623 A1 | 3/2018 | Wodrich et al. |
| 2018/0067194 A1 | 3/2018 | Wodrich et al. |
| 2018/0105176 A1 | 4/2018 | Pawlicki et al. |
| 2018/0231635 A1 | 8/2018 | Woehlte |
| 2018/0231657 A1 | 8/2018 | Woehlte |
| 2018/0299533 A1 | 10/2018 | Pliefke et al. |
| 2018/0372841 A1* | 12/2018 | Hieida ................. G05D 1/0234 |
| 2019/0061760 A1 | 2/2019 | Pawlicki et al. |
| 2019/0072666 A1 | 3/2019 | Duque Biarge et al. |
| 2019/0072667 A1 | 3/2019 | Duque Biarge et al. |
| 2019/0072668 A1 | 3/2019 | Duque Biarge et al. |
| 2019/0072669 A1 | 3/2019 | Duque Biarge et al. |
| 2019/0217775 A1 | 7/2019 | May et al. |
| 2019/0339382 A1 | 11/2019 | Hess et al. |

\* cited by examiner

VEHICULAR RADAR SYSTEM WITH AUTOMATIC SENSOR ALIGNMENT

CROSS REFERENCE TO RELATED APPLICATION

The present application claims the filing benefits of U.S. provisional application Ser. No. 62/810,453, filed Feb. 26, 2019, which is hereby incorporated herein by reference in its entirety.

FIELD OF THE INVENTION

The present invention relates generally to a vehicle sensing system for a vehicle and, more particularly, to a vehicle vision system that utilizes one or more radar sensors at a vehicle.

BACKGROUND OF THE INVENTION

Use of radar sensors in vehicle imaging systems is common and known. Examples of such known systems are described in U.S. Pat. Nos. 6,587,186; 6,710,770 and/or 8,013,780, which are hereby incorporated herein by reference in their entireties.

SUMMARY OF THE INVENTION

The present invention provides a method for calibrating a driving assistance system or sensing system or control system for a vehicle that utilizes one or more radar sensors to sense regions exterior of the vehicle, with the radar sensor that transmits and receives signals, with the received signals processed to detect the presence of objects at or near the vehicle in the field of sensing of the sensor. The method includes establishing at least one spherical radar reflector at a location exterior a vehicle equipped with the vehicular sensing system and configuring the sensing system to enter a calibration mode. Once in the calibration mode, the method includes transmitting, by at least one of the plurality of transmitters, calibration radio waves. The method also includes receiving, by the plurality of receivers of the at least two radar sensors, reflected calibration waves. The reflected calibration waves include calibration waves reflected off the spherical radar reflector. The method also includes, in response to receiving the reflected calibration radio waves, calibrating, by the controller, the sensing system.

These and other objects, advantages, purposes and features of the present invention will become apparent upon review of the following specification in conjunction with the drawings.

DESCRIPTION OF THE PREFERRED EMBODIMENTS

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
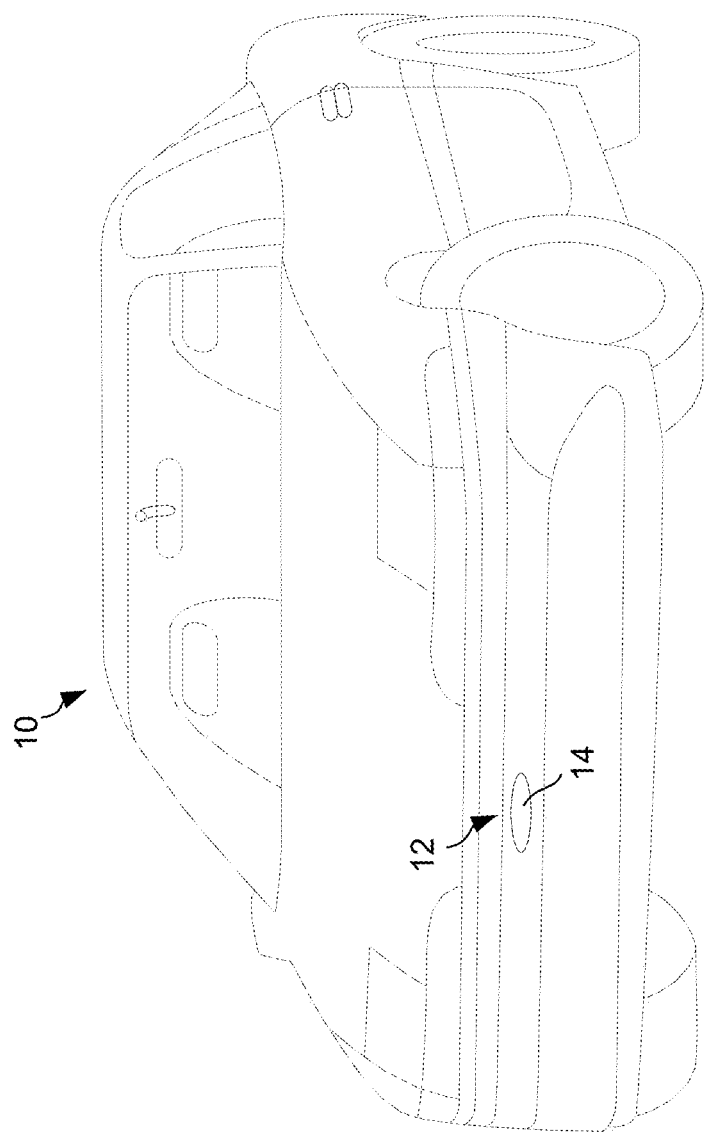
FIG. 1 is a perspective view of a vehicle with a sensing system that incorporates a radar sensor in accordance with the present invention.

Referring now to the drawings and the illustrative embodiments depicted therein, a vehicle 10 (FIG. 1) includes a driving assistance system or sensing system 12 that includes at least one radar sensor unit, such as a forward facing radar sensor unit 14 (and the system may optionally include multiple exterior facing sensors, such as cameras, radar, or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) that includes electronic circuitry and associated software. The electronic circuitry includes a data processor that is operable to process data captured by the radar sensor(s) and provided to the ECU. The sensing system may also include a radar sensor 14 that includes transmitters that transmit radio signals via plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controls at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

Figure 2:
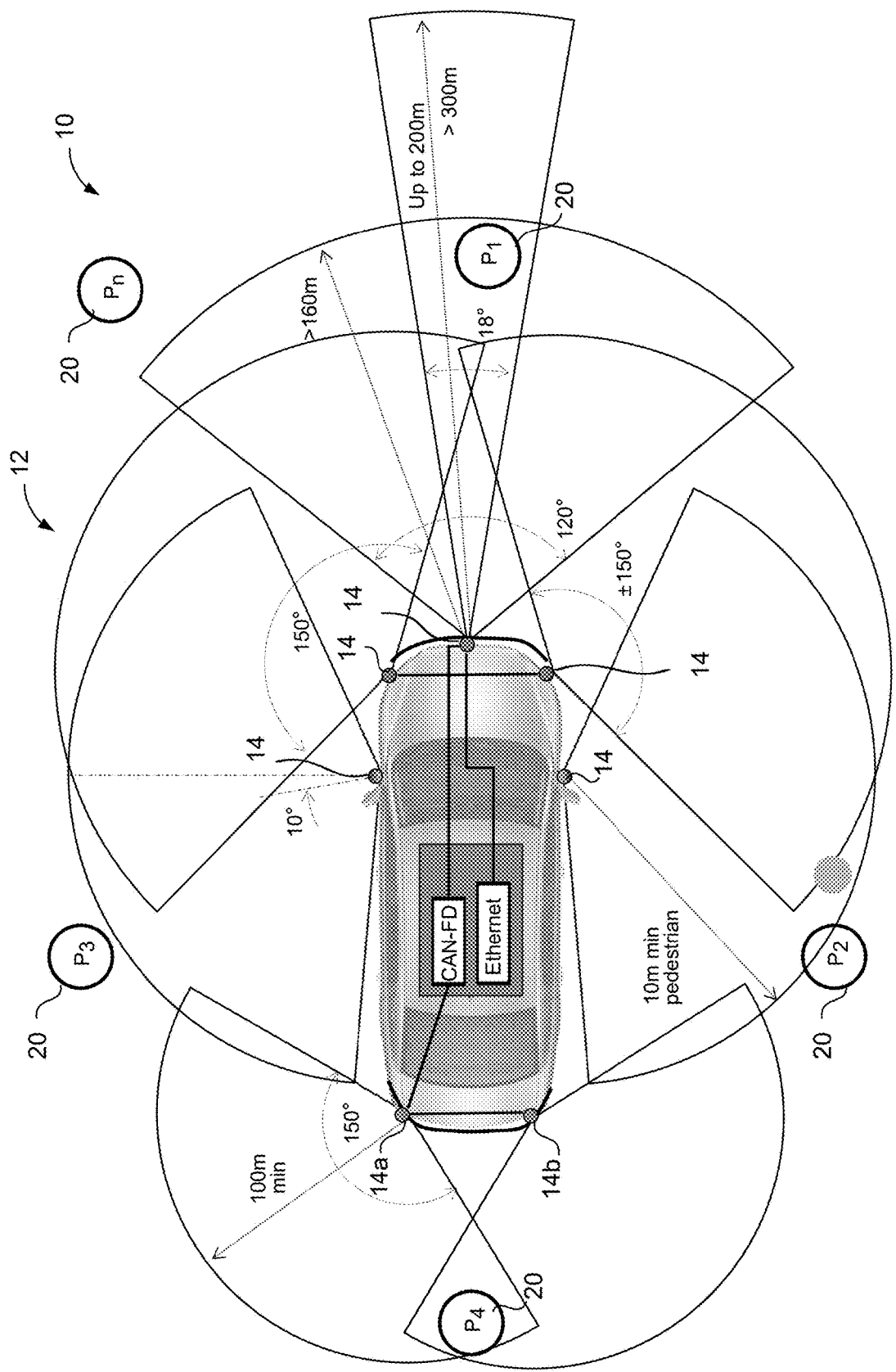
FIG. 2 is a plan view of a vehicle equipped with a plurality of radar sensors and respective fields of view for each radar sensor with a plurality of spherical radar reflectors disposed around the exterior of the vehicle in accordance with the present invention.

Referring now to FIG. 2, the sensing system 12 comprises a radar sensing system that includes a plurality of spherical radar reflectors 20 that provide constant radar cross section (RCS) response in all directions. That is, regardless the position of the vehicle (and hence, the radar sensor(s) 14) and the position and orientation of the reflectors, the RCS remains the same. The spherical radar reflectors 20 comprise a spherical surface (or partial spherical surface) that faces generally toward the vehicle (and that is within the fields of sensing of the respective radar sensors) and that extends around the surface of the reflector sufficiently so that the transmitted radar waves from any of the radar sensor(s) are reflected off the spherical surface (with the opposite side of the reflector not needing to be spherical). The term "spherical reflector" as used herein, is intended to describe the spherical surface that faces the vehicle (and that is within the fields of sensing of the respective radar sensors) and is not intended to require that the reflector comprise a sphere.

The radar reflectors 20 are placed at locations $P_1$-$P_n$ around the vehicle 10. The reflectors 20 may be placed in areas where the fields of sensing or fields of view (FOVs) of equipped radar sensors 14 overlap. For example, the reflector at position $P_4$ is placed in an area of overlap between the FOVs of sensor 14a and sensor 14b. The reflectors 20 may be positioned at any point around the vehicle in three dimensions (i.e., the x, y, and, z dimensions) as appropriate by the positioning of the radar sensors 14. For example, if one or more radar sensors 14 are angled upward (i.e., away from the ground), the reflectors 20 may be placed higher above the ground relative to reflectors associated with radar sensors angled downward (i.e., towards the ground).

The positioning of the reflectors 20 allow for a sequence of operations to calibrate the sensing system 12. The system 12 may first be placed in a calibration mode. The calibration mode causes one or more transmitters of one or more of the sensors 14 equipped at the vehicle to transmit a fixed and predetermined transmission code known to all radar sensors 14. Each receiver of each sensor 14 equipped at the vehicle is placed into a listening mode. The transmitters transmit the fixed transmission code, and the code reflects off of one or more reflectors 20. The reflected code is then received by two or more receivers of sensors 14 across multiple receive channels, which causes localization in the x, y, and z dimensions to initiate (in each receiving sensor 14 that receives the transmission). In some examples, only a single transmitter transmits the fixed transmission code at a time, and then the cycle of transmitting the fixed code and receivers receiving the reflected fixed code is repeated for each transmitter equipped at the vehicle. Each cycle may be repeated any number of times for a given position of each spherical reflector 20.

The sensing system 12 may determine the exact location (in all three dimensions), roll, pitch, and yaw of all sensors 14 based on the received fixed transmission code using long baseline (LBL) techniques. The system 12 may measure the distance from each sensor 14 to multiple spherical reflectors 20 (e.g., by measuring time of flight) and triangulate the position, roll, pitch, and yaw of each sensor based on the measured distances. Each spherical reflector 20 may be located at a known position from each sensor 14. The locations of the reflectors 20 may be moved during calibration. For example, a transmitter may transmit the fixed transmission code with the reflectors 20 in a first configuration and then may again transmit the fixed transmission code with the reflectors 20 in a second configuration. Different transmitters may transmits the fixed transmission codes with the reflectors 20 in different configurations. Offsets (e.g., an amount the sensor is off from a nominal position or a determined misalignment) for each radar sensor 14 individually may be determined or calculated (e.g., based on the determined position vs. the known position) and then stored. For example, the offsets may be stored in nonvolatile memory accessible by the control. The sensing system 12 may then use the stored offsets to maintain calibration of the sensors 14. That is, during normal operation of the vehicle, processing of data transmitted and/or captured by the radar sensors may be adjusted based on respective calibration data.

The positioning of the spherical reflectors 20 in areas of overlap of the fields of sensing of two or more sensors 14 allows the sensing system 12 to be calibrated and aligned. Positioning of the spherical reflectors in four or more areas of radar sensor overlap (around the vehicle, such as forward, rearward and sideward at each side of the vehicle) allows the entire radar sensor suite (the plurality of radar sensors of the radar sensing system) to be aligned. The system 12 may further include inputs from an inertial measurement unit (IMU) to actively compensate measured radar responses to dynamic changes in the pitch, roll, and yaw of the vehicle while in operation. Also, during operation, and via processing of captured radar data, the system may detect and/or identify roadway infrastructure (e.g., signs) to verify alignment of any cameras or other sensors also disposed at the vehicle. For example, the system may perform edge detection on captured image data and captured radar data and compare orientations of the edges. The cameras or other sensors could also be aligned similarly during calibration, during service, or during repair (e.g., after a collision), as described above. For example, after a collision or other accident involving the equipped vehicle, one or more of the sensors may be misaligned. Recalibration of the system may determine new offsets and replace the previously stored offsets with the new offsets in order to compensate for or accommodate the determined misalignment of one or more of the sensors.

Thus, the sensing system 12 may be calibrated by placing spherical reflectors 20 in positions that overlap the field of view of two or more radar sensors 14. Transmitters from the sensors 14 transmit a fixed transmission code that is known to all receivers. The receivers of each sensor 14 are placed in a listen mode and two or more receivers at a time receive the fixed transmission code reflected off of one or more spherical reflectors. The received fixed transmission codes are used (via long baseline techniques) to triangulate the position, roll, pitch, and yaw of each sensor 14. In response to determination of a misalignment of one or more of the sensors, the system calibrates the sensor or the system to correct or accommodate a determined misalignment (such as via adjusting processing of the data captured by the determined misaligned sensor to accommodate the offset or misalignment of the sensor's position, roll, pitch and/or yaw at the vehicle).

Thus, to calibrate the sensing system, the vehicle may be positioned at a calibration area or facility, where the spherical radar reflectors are disposed so as to at least partially surround the vehicle and so that each radar reflector is located at locations where fields of sensing of at least two radar sensors overlap. The calibration area may be any area where the vehicle can be parked (e.g., at a testing facility or a manufacturing facility, such as at an end of line testing station or facility at the vehicle manufacturing plant or the like), and where the spherical radar reflectors can be placed or located at spaced apart locations at least partially around the vehicle. When the vehicle is located relative to the spherical radar reflectors in this manner, the system enters the calibration mode and at least one transmitter transmits the radio signal that is reflected off one or more of the spherical radar reflectors and received by the receiving antennae of at least two of the radar sensors. Because the system knows the location of the spherical radar reflector relative to the vehicle and relative to the radar sensors, and because at least two radar sensors receive the transmitted signal reflected off each spherical radar reflector, the system calibrates the sensors by determining misalignment of the radar sensors by processing output data from the radar sensors that are sensing the spherical radar reflector(s). The system may perform an initial calibration for the vehicle (e.g., after manufacturing) or may perform a subsequent recalibration (e.g., after a collision).

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/ or 6,587,186, and/or International Publication Nos. WO 2018/007995 and/or WO 2011/090484, and/or U.S. Publication Nos. US-2018-0231635; US-2018-0045812;

US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for calibrating a vehicular sensing system, the method comprising:

establishing at least one spherical radar reflector at a location exterior a vehicle equipped with the vehicular sensing system;

wherein the vehicular sensing system at the equipped vehicle comprises at least two radar sensors disposed at the vehicle so as to have respective fields of sensing exterior of the vehicle, and wherein each radar sensor of the at least two radar sensors comprises a plurality of transmitters that, during operation of the respective radar sensor, transmits radio signals via a plurality of antennas, and wherein each radar sensor of the at least two radar sensors comprises a plurality of receivers that receive radio signals via the plurality of antennas, and wherein the received radio signals are transmitted radio signals that are reflected from an object present in the field of sensing of the respective radar sensor;

wherein the vehicular sensing system at the equipped vehicle comprises a controller, the controller comprising a data processor that processes received radio signals received by the plurality of receivers of each radar sensor of the at least two radar sensors;

wherein, with the at least one spherical radar reflector established at the location exterior the vehicle, the respective location of the at least one spherical radar reflector relative to the vehicle comprises a location where the fields of sensing of the at least two radar sensors overlap;

with the at least one spherical radar reflector established at the location exterior the vehicle, entering a calibration mode of the vehicular sensing system;

responsive to entering the calibration mode, transmitting calibration radio waves by at least one of the plurality of transmitters of at least one radar sensor of the at least two radar sensors;

receiving, by the plurality of receivers of the at least two radar sensors, reflected calibration radio waves, wherein the reflected calibration radio waves at least comprise the transmitted calibration radio waves reflected off the at least one spherical radar reflector;

processing the received reflected calibration radio waves via the data processor; and responsive to processing of the received reflected calibration radio waves, calibrating, by the controller, the vehicular sensing system.

2. The method of claim 1, wherein transmitting calibration radio waves comprises transmitting a fixed transmission code known to each radar sensor of the at least two radar sensors.

3. The method of claim 1, comprising configuring the vehicular sensing system to enter the calibration mode by placing each receiver of each radar sensor of the at least two radar sensors into a listening mode.

4. The method of claim 1, wherein calibrating the vehicular sensing system comprises determining at least one selected from the group consisting of (i) a position of each radar sensor of the at least two radar sensors, (ii) a roll of each radar sensor of the at least two radar sensors, (iii) a pitch of each radar sensor of the at least two radar sensors and (iv) a yaw of each radar sensor of the at least two radar sensors.

5. The method of claim 4, wherein calibrating the vehicular sensing system comprises using long baseline techniques.

6. The method of claim 5, wherein calibrating the vehicular sensing system comprises using triangulation.

7. The method of claim 1, wherein calibrating the vehicular sensing system comprises determining a misalignment of at least one radar sensor of the at least two radar sensors and adjusting processing of outputs of the plurality of receivers of the at least one radar sensor to accommodate the determined misalignment of the at least one radar sensor.

8. The method of claim 7, wherein calibrating the vehicular sensing system comprises storing in nonvolatile memory offsets for each radar sensor of the at least two radar sensors based on the respective determined misalignment.

9. The method of claim 1, wherein transmitting calibration radio waves comprises sequentially transmitting calibration radio waves from each radar sensor of the at least two radar sensors.

10. The method of claim 1, wherein the vehicular sensing system comprises at least one camera, and wherein the method comprises verifying, by the controller, an alignment of the camera based on the calibration of the at least two radar sensors.

11. The method of claim 1, wherein the vehicular sensing system comprises an inertial measurement unit (IMU), and wherein the method comprises compensating, by the controller, measured radar responses to dynamic changes of the at least two radar sensors based on inputs received from the IMU.

12. A method for calibrating a vehicular sensing system, the method comprising:

establishing a plurality of spherical radar reflectors at a plurality of locations exterior a vehicle equipped with the vehicular sensing system;

wherein the vehicular sensing system at the equipped vehicle comprises a plurality of radar sensors disposed at the vehicle so as to have respective fields of sensing exterior of the vehicle, and wherein each radar sensor of the plurality of radar sensors comprises a plurality of transmitters that, during operation of the respective radar sensor, transmits radio signals via a plurality of antennas, and wherein each radar sensor of the plurality of radar sensors comprises a plurality of receivers that receive radio signals via the plurality of antennas, and wherein the received radio signals are transmitted radio signals that are reflected from an object present in the field of sensing of the respective radar sensor;

wherein the vehicular sensing system at the equipped vehicle comprises a controller, the controller comprising a data processor that processes received radio signals received by the plurality of receivers of each radar sensor of the plurality of radar sensors;

wherein, with the plurality of spherical radar reflectors each established at the location exterior the vehicle, the respective location for each spherical radar reflector relative to the vehicle comprises a location where the fields of sensing of at least two radar sensors of the plurality of radar sensors overlap;

with the plurality of spherical radar reflectors established at the plurality of locations exterior the vehicle, entering a calibration mode of the vehicular sensing system;

responsive to entering the calibration mode, transmitting calibration radio waves by at least one of the plurality of transmitters of at least some of the radar sensors of the plurality of radar sensors;

receiving, by the plurality of receivers of the plurality of radar sensors, reflected calibration radio waves, wherein the reflected calibration radio waves at least comprise the transmitted calibration radio waves reflected off at least one spherical radar reflector of the plurality of spherical radar reflectors;

processing the received reflected calibration radio waves via the data processor; and responsive to processing of the received reflected calibration radio waves, calibrating, by the controller, the vehicular sensing system.

13. The method of claim 12, wherein calibrating the vehicular sensing system comprises determining a misalignment of at least one radar sensor of the plurality of radar sensors and adjusting processing of outputs of the plurality of receivers of the at least one radar sensor to accommodate the determined misalignment of the at least one radar sensor.

14. The method of claim 13, wherein calibrating the vehicular sensing system comprises storing in nonvolatile memory offsets for each radar sensor of the plurality of radar sensors based on the respective determined misalignment for each radar sensor.

15. The method of claim 12, wherein transmitting calibration radio waves comprises transmitting a fixed transmission code known to each radar sensor of the plurality of radar sensors.

16. The method of claim 12, comprising configuring the vehicular sensing system to enter the calibration mode by placing each receiver of each radar sensor of the plurality of radar sensors into a listening mode.

17. The method of claim 12, wherein calibrating the vehicular sensing system comprises determining at least one selected from the group consisting of (i) a position of each radar sensor of the plurality of radar sensors, (ii) a roll of each radar sensor of the plurality of radar sensors, (iii) a pitch of each radar sensor of the plurality of radar sensors and (iv) a yaw of each radar sensor of the plurality of radar sensors.

18. The method of claim 12, wherein transmitting calibration radio waves comprises sequentially transmitting calibration radio waves from each radar sensor of the plurality of radar sensors.

19. A method for calibrating a vehicular sensing system, the method comprising:

establishing a plurality of spherical radar reflectors at a plurality of locations exterior a vehicle equipped with the vehicular sensing system;

wherein the vehicular sensing system at the equipped vehicle comprises a plurality of radar sensors disposed at the vehicle so as to have respective fields of sensing exterior of the vehicle, and wherein each radar sensor of the plurality of radar sensors comprises a plurality of transmitters that, during operation of the respective radar sensor, transmits radio signals via a plurality of antennas, and wherein each radar sensor of the plurality of radar sensors comprises a plurality of receivers that receive radio signals via the plurality of antennas, and wherein the received radio signals are transmitted radio signals that are reflected from an object present in the field of sensing of the respective radar sensor;

wherein the vehicular sensing system at the equipped vehicle comprises a controller, the controller comprising a data processor that processes received radio signals received by the plurality of receivers of each radar sensor of the plurality of radar sensors;

wherein, with the plurality of spherical radar reflectors each established at the location exterior the vehicle, the respective location for each spherical radar reflector relative to the vehicle comprises a location where the fields of sensing of at least two radar sensors of the plurality of radar sensors overlap;

with the plurality of spherical radar reflectors established at the plurality of locations exterior the vehicle, entering a calibration mode of the vehicular sensing system;

responsive to entering the calibration mode, transmitting calibration radio waves comprising a fixed transmission code known to each radar sensor of the plurality of radar sensors;

receiving, by the plurality of receivers of the plurality of radar sensors, reflected calibration radio waves, wherein the reflected calibration radio waves at least comprise the transmitted calibration radio waves reflected off at least one spherical radar reflector of the plurality of spherical radar reflectors;

processing the received reflected calibration radio waves via the data processor;

responsive to processing of the received reflected calibration radio waves, calibrating, by the controller, the vehicular sensing system; and wherein calibrating the vehicular sensing system comprises determining a misalignment of at least one radar sensor of the plurality of radar sensors, adjusting processing of outputs of the plurality of receivers of the at least one radar sensor to accommodate the determined misalignment of the at least one radar sensor and storing in nonvolatile memory offsets for each radar sensor of the plurality of radar sensors based on the respective determined misalignment for each radar sensor.

20. The method of claim 19, comprising configuring the vehicular sensing system to enter the calibration mode by placing each receiver of each radar sensor of the plurality of radar sensors into a listening mode.

* * * * *